US012681141B2

(12) United States Patent
Gao et al.

(10) Patent No.: US 12,681,141 B2
(45) Date of Patent: Jul. 14, 2026

(54) ADAPTIVE DOPPLER WINDOW

(71) Applicant: Aptiv Technologies AG, Schaffhausen (CH)

(72) Inventors: Boyi Gao, Westfield, IN (US); Zhengyu Peng, Westfield, IN (US)

(73) Assignee: Aptiv Technologies AG, Schaffhausen (CH)

( * ) Notice: Subject to any disclaimer, the term of this patent is extended or adjusted under 35 U.S.C. 154(b) by 311 days.

(21) Appl. No.: 18/239,307

(22) Filed: Aug. 29, 2023

(65) Prior Publication Data

US 2025/0076458 A1     Mar. 6, 2025

(51) Int. Cl.
| | |
|---|---|
| *G01S 7/35* | (2006.01) |
| *G01S 7/41* | (2006.01) |
| *G01S 13/58* | (2006.01) |
| *G01S 13/931* | (2020.01) |

(52) U.S. Cl.
CPC ............. *G01S 7/354* (2013.01); *G01S 7/356* (2021.05); *G01S 7/415* (2013.01); *G01S 13/584* (2013.01); *G01S 13/931* (2013.01)

(58) Field of Classification Search
CPC .. G01S 13/325; G01S 13/5244; G01S 13/584; G01S 13/931; G01S 2013/9318; G01S 2013/93185; G01S 2013/9319; G01S 2013/93271; G01S 7/354; G01S 7/356; G01S 7/415
See application file for complete search history.

(56) References Cited

U.S. PATENT DOCUMENTS

| | | | |
|---|---|---|---|
| 5,539,412 A | 7/1996 | Mendelson | |
| 7,023,938 B1 * | 4/2006 | Kapoor | ............... H04L 27/2647 |
| | | | 375/232 |
| 9,952,319 B2 | 4/2018 | Searcy et al. | |

(Continued)

FOREIGN PATENT DOCUMENTS

| | | | |
|---|---|---|---|
| DE | 102019103684 | * 8/2019 | |
| DE | 102019103684 A1 * | 8/2019 | ........... G01S 13/931 |

OTHER PUBLICATIONS

Extended European Search Report regarding European Patent Application No. 24173203.1, dated Sep. 17, 2024.

(Continued)

*Primary Examiner* — Timothy A Brainard
(74) *Attorney, Agent, or Firm* — Harness, Dickey & Pierce, P.L.C.

(57) ABSTRACT

Systems and methods for adaptive Doppler window function selection are provided and include a radar system that determines whether a dominant target is present in a sensing environment of the radar system based on received radar signals reflected from an object and selects either a first window function or a second window function based on whether the dominant target is present in the sensing environment. The radar system performs a Doppler fast Fourier transform (FFT) procedure with the selected window function. The first and second window functions have different signal-to-noise ratio (SNR) degradations when used in performing the Doppler FFT procedure. The radar system also determines information about the object based on performing the Doppler FFT procedure, the information including at least one of a location, a size, an orientation, a velocity, and an acceleration of the object.

12 Claims, 4 Drawing Sheets

(56)                 References Cited

U.S. PATENT DOCUMENTS

| | | | |
|---|---|---|---|
| 2007/0040728 A1* | 2/2007 | Nishimura | G01S 13/426 |
| | | | 342/107 |
| 2009/0268788 A1* | 10/2009 | Simic | H04K 3/224 |
| | | | 375/150 |
| 2014/0358552 A1* | 12/2014 | Xu | G10L 25/78 |
| | | | 704/275 |
| 2017/0160380 A1* | 6/2017 | Searcy | G01S 13/288 |
| 2019/0250249 A1* | 8/2019 | Raphaeli | G01S 13/582 |
| 2022/0373661 A1* | 11/2022 | Lee | G01S 17/894 |
| 2023/0194705 A1 | 6/2023 | Gao et al. | |

OTHER PUBLICATIONS

"Velocity Tracking Based on Interpolated Adaptive Doppler Filter,"
J. Valarmathi et al., IEEE, dated Jul. 9, 2012.

\* cited by examiner

300

ADAPTIVE DOPPLER WINDOW

FIELD

The present disclosure relates to radar systems and methods and, more particularly, to radar systems and methods that perform a Doppler fast Fourier transform (FFT) procedure using a window function.

BACKGROUND

This section provides background information related to the present disclosure which is not necessarily prior art.

Automotive radar sensors are used in vehicle sensing systems to determine information about object in the environment of the vehicle, such as the location, size, orientation, velocity, and acceleration of objects in the environment of the vehicle. The sensed information can, for example, be used by other vehicle systems, such as autonomous driving systems and/or advanced driver assistance systems (ADAS), etc., to control steering, braking, throttle, and/or other vehicle systems.

A multiple-input multiple-output (MIMO) radar system may use multiple transmit channels and a receive channel. To allow the receive channel to distinguish between reflected signals originating from each of the transmit channels, the radar system can modulate the phase of the transmit signals using a phase modulation code. The radar system can then demodulate the received signals using the transmit codes to recover the signal from each transmit channel and suppress signals transmitted from the other transmit channels. Upon demodulation, however, the energy of the suppressed signals from the other transmit channels is still present and distributed across a frequency band. The distributed energy from the suppressed signals present in the recovered signal is referred to as residue and in some situations a residue estimation and subtraction technique (REST) is applied to remove the residue and increase the Doppler dynamic range of the radar system. In addition, to increase the Doppler dynamic range of the radar system, a window function can be used in conjunction with performing Doppler FFT on the received signals. For example, a Chebyshev window function can be used. Use of the Chebyshev window function, however, can result in a signal-to-noise ratio (SNR) loss.

SUMMARY

This section provides a general summary of the disclosure and is not a comprehensive disclosure of its full scope or all of its features.

A radar system is provided and includes a processor and memory configured to transmit radar signals using a plurality of transmit channels by performing binary phase modulation (BPM) using different BPM codes for each of the plurality of transmit channels and receive radar signals reflected from at least one object with a receive channel. The processor and memory are further configured to determine whether a dominant target is present in a sensing environment of the radar system based on the received radar signals. The processor and memory are further configured to select one of a first window function and a second window function based on whether the dominant target is present in the sensing environment. The processor and memory are further configured to perform a Doppler fast Fourier transform (FFT) procedure with the selected window function from the first and second window functions, the first and second window functions having different signal-to-noise ratio (SNR) degradations when used in performing the Doppler FFT procedure. The processor and memory are further configured to determine information about the object based on performing the Doppler FFT procedure, the information including at least one of a location, a size, an orientation, a velocity, and an acceleration of the object.

In other aspects, the SNR degradation of the first window function is less than the SNR degradation of the second window function.

In other aspects, the first window function is selected by the processor for performing the Doppler FFT in response to determining that the dominant target is not present in the sensing environment of the radar system and the second window function is selected by the processor for performing the Doppler FFT in response to determining that the dominant target is present in the sensing environment of the radar system.

In other aspects, the processor and memory are further configured to perform a residue estimation and subtraction technique (REST) to remove residue resulting from performing BPM using different BPM codes for each of the plurality of transmit channels in response to determining that the dominant target is present in the sensing environment of the radar system.

In other aspects, the radar system is located in a vehicle and the information about the object is communicated to a vehicle system that controls at least one of a steering system, a braking system, and a throttle system of the vehicle based on the information about the object.

In other aspects, the vehicle system includes at least one of an autonomous driving system and a driver assistance system.

In other aspects, the processor and memory are further configured to determine whether the dominant target is present in the sensing environment of the radar system by determining a total amplitude of received signals in a current receive bin and a noise estimate from a previous frame and determining that the dominant target is present in response to a ratio of the total amplitude to the noise estimate being greater a predetermined ratio threshold.

A method is also provided and includes transmitting, with a radar system having a processor and memory, radar signals using a plurality of transmit channels by performing binary phase modulation (BPM) using different BPM codes for each of the plurality of transmit channels and receiving, with the radar system, radar signals reflected from at least one object with a receive channel. The method also includes determining, with the radar system, whether a dominant target is present in a sensing environment of the radar system based on the received radar signals. The method also includes selecting, with the radar system, one of a first window function and a second window function based on whether the dominant target is present in the sensing environment, the first and second window functions having different signal-to-noise ratio (SNR) degradations. The method also includes performing, with the radar system, a Doppler fast Fourier transform (FFT) procedure with the selected window function from the first and second window functions. The method also includes determining, with the radar system, information about the object based on performing the Doppler FFT procedure, the information including at least one of a location, a size, an orientation, a velocity, and an acceleration of the object.

In other aspects, the SNR degradation of the first window function is less than the SNR degradation of the second window function.

In other aspects, the first window function is selected for performing the Doppler FFT in response to determining that the dominant target is not present in the sensing environment of the radar system and the second window function is selected for performing the Doppler FFT in response to determining that the dominant target is present in the sensing environment of the radar system.

In other aspects, the method includes performing, with the radar system, a residue estimation and subtraction technique (REST) to remove residue resulting from performing BPM using different BPM codes for each of the plurality of transmit channels in response to determining that the dominant target is present in the sensing environment of the radar system.

In other aspects, the radar system is located in a vehicle, the method further comprising communicating the information about the object to a vehicle system that controls at least one of a steering system, a braking system, and a throttle system of the vehicle based on the information about the object.

In other aspects, the vehicle system includes at least one of an autonomous driving system and a driver assistance system.

In other aspects, determining whether the dominant target is present in the sensing environment of the radar system includes determining, with the radar system, a total amplitude of received signals in a current receive bin and a noise estimate from a previous frame and determining, with the radar system, that the dominant target is present in response to a ratio of the total amplitude to the noise estimate being greater a predetermined ratio threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure is directed to a radar system that selects and utilizes different window functions in conjunction with performing Doppler FFT on received radar signals depending on the characteristics of the radar sensing environment. For example, as discussed in further detail below, if a dominant target is present in the sensing environment, a window function having a higher associated dynamic range and a lower associated SNR, such as a Chebyshev window function, can be used. Since the dominant target is present, the dominant target can be detected even with the increased signal loss resulting from the lower SNR and increased noise. If a dominant target is not present, a window function having a higher associated SNR and a lower associated dynamic range, such as a Taylor window function, can be used. In this way, since there is no dominant target present, smaller targets can be detected by using a window function with the higher associated SNR, decreased noise, and lower associated signal loss. As such, the present disclosure recognizes the tradeoff between higher SNR and lower dynamic range, on the one hand, and lower SNR and higher dynamic range on the other hand in selecting an appropriate window function for use in conjunction with the Doppler FFT on received signals. Recognizing this tradeoff, the radar systems and methods of the present disclosure select an appropriate window function based on characteristics of the radar sensing environment and, in particular, based on whether a dominant target is present and being detected within the radar sensing environment. While the present example utilizes a Chebyshev window function and a Taylor window function, recognizing the tradeoff between SNR degradation and dynamic range/maximum SLL, other window functions can be used in light of other tradeoff factors and aspects of the window functions. For example, different window functions can be used to account for tradeoffs in SNR loss, maximum SLL, main lobe width, SLL roll off, etc. Additionally or alternatively, tradeoffs of other factors or aspects can be used and accommodated by the use of different window functions.

In this way, radar systems in accordance with the present disclosure can adaptively use different window functions based on characteristics of the radar sensing environment and select a window function with desirable dynamic range and SNR characteristics depending on whether a dominant target is present in the radar sensing environment.

Figure 1:
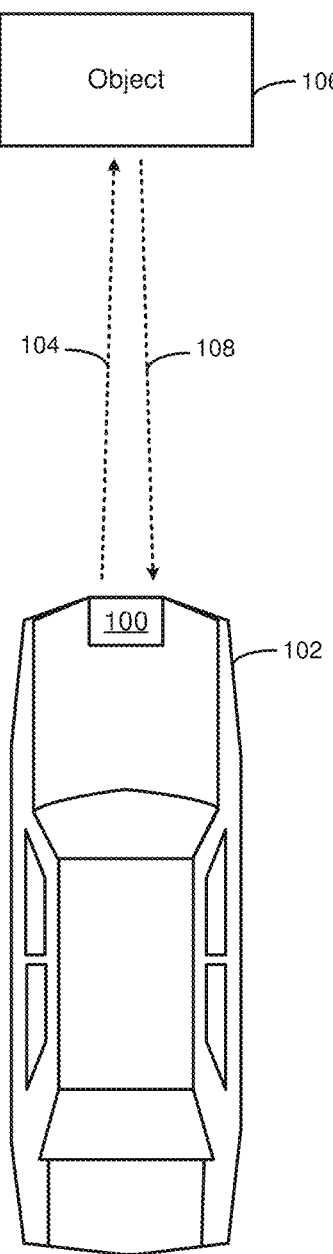
FIG. 1 is a block diagram of a vehicle having a radar system in accordance with the present disclosure.
Figure 2:
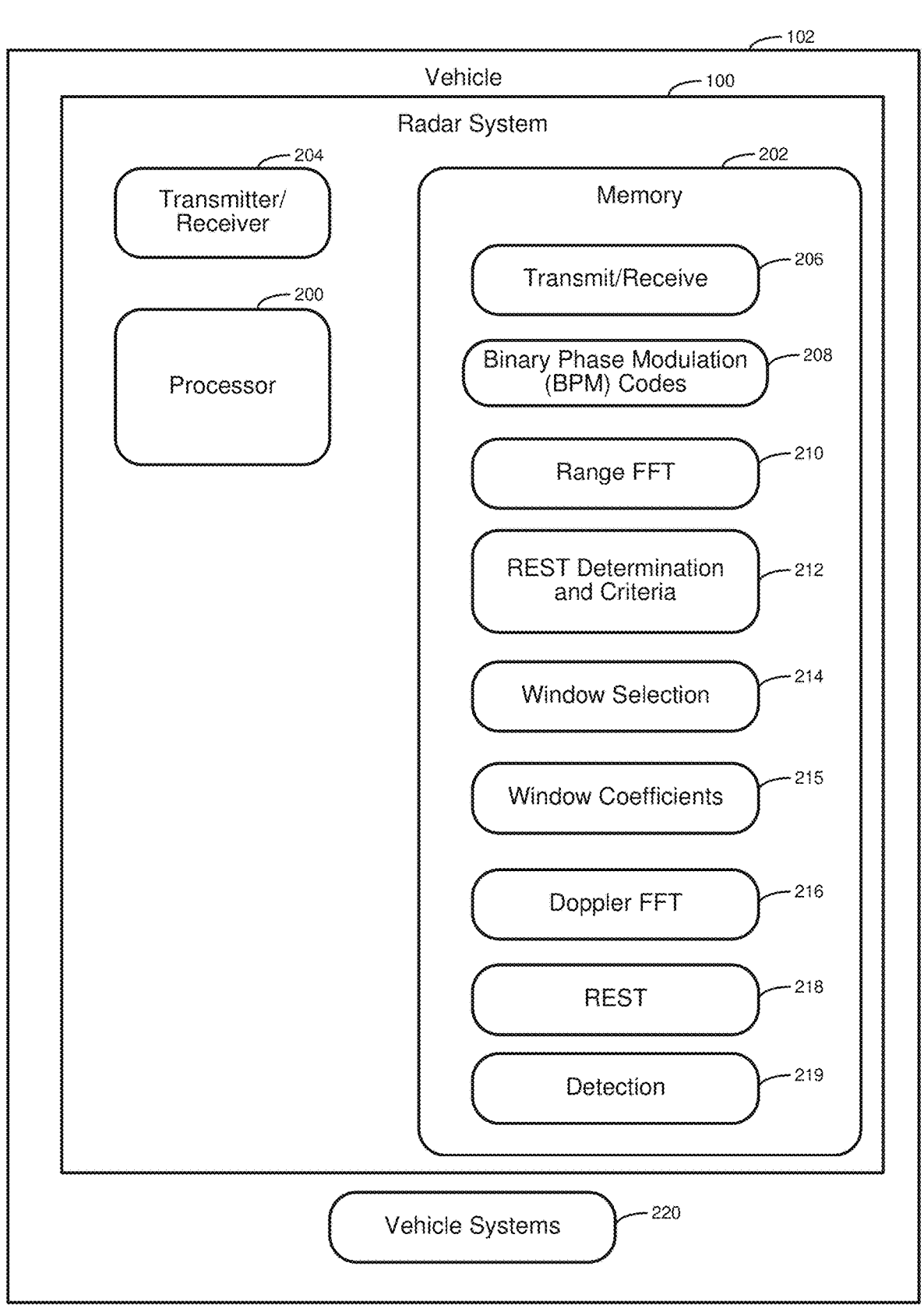
FIG. 2 is another block diagram of a vehicle having a radar system in accordance with the present disclosure.

With reference to FIGS. 1 and 2, a radar system 100 of a vehicle 102 in accordance with the present disclosure is shown. The radar system 100 transmits signals 104 that are reflected off of an object 106 in the environment of the vehicle 102. While a single object 106 is shown for purposes of illustration in FIG. 1, in practice the object 106 may comprise multiple objects, including a dominant target object and one or more smaller non-dominant target objects. The radar system 100 receives signals 108 that are reflected off the object 106. Based on characteristics of the received signals 108, the radar system 100 determines information about the object, such as the location, size, orientation, velocity and acceleration of the object 106.

The radar system 100 includes a processor 200 and memory 202 that stores code executed by the processor to perform the required functionality for transmitting and receiving signals 104, 108 and determining information about the object 106 based on the characteristics of the received signals 108. While the example implementation illustrates a single processor 200, multiple processors and/or modules working together can alternatively be used. The radar system 100 includes a transmitter/receiver 204 that transmits and receives the signals 104, 108. The transmitter/receiver 204 includes one or more transmit (Tx) antennas and one or more receive (Rx) antennas for transmitting and receiving signals 104, 108. The processor 200, for example, executes transmit/receive code 206 stored in memory 202 to transmit and receive the signals 104, 108.

The processor 200 can control the transmitter/receiver 204 to operate two transmit channels and one receive channel. As noted above, in order for the processor 200 to distinguish the signals 108 received by the receive channel as originating from each of the transmit channels, the processor 200 can modulate a phase of each of the transmit signals 104 using a phase modulation code. For example, the processor 200 can perform binary phase modulation (BPM) using BPM codes 208 that are also stored in the memory 202. The processor 200 can then demodulate the received signals 108 using the BPM codes 208 to recover the received signal transmitted from each transmit channel and suppress signals transmitted from the other transmit channel. While the present example includes two transmit channels and one receive channel, other combinations of transmit and receive channels can be used in accordance with the present disclosure. For example, the radar system 100 can include four transmit channels and one receive channel. The processor 200 can perform range FFT processing on the received demodulated signals by executing range FFT code 210 stored in the memory 202 to determine range information about the object 106.

Upon demodulation of the received signals 108, the energy of the suppressed signal from the other transmit channel is still present and distributed across a frequency band of the demodulated signal. The distributed energy from the suppressed signal(s) present in the recovered demodulated signal is referred to as residue. The processor 200 can perform a residue estimation and subtraction technique (REST) to remove the residue and increase the Doppler dynamic range of the radar system 100. The residue present in the demodulated signal arises from, or is due to, a lack of perfect orthogonality between the signals applied to each transmit channel. The residue present in the recovered demodulated signal from a particular transmit channel, for example, consists of the superposition of the residue from the other transmit channel(s). The level or strength of the residue is related to the received signal levels and the degree of orthogonality between the transmit signals. The cross-correlation of the phase codes used for each transmit channel determines the degree of orthogonality between the transmit signals and also determines the shape of the frequency spectrum of the residue.

The REST procedure can include a number of processing steps executed by the processor 200 based on REST code 218 stored in the memory. As a first step, the processor 200 can demodulate the received signals 108 based on the BPM codes 208 used by the transmit channels to transmit the signals 104. As a next step, the processor 200 can identify signals in sub-channels by identifying frequency bins that are above the peak residue from other channels. The signals are then isolated from the residue by using filters in the frequency domain to output signals in different frequency domains. As a next step, the processor 200 can estimate the residue that would be generated by each sub-channel when forming other sub-channels. For example, the processor 200 can determine the cross-correlation between phase codes from all other sub-channels, calculated the FFT of each resulting cross-correlation code, and then convolve it with one of the signals from the previous step. As another example, the processor 200 can convert one of the signals from the previous step to a time-domain by a reduced dimension inverted FFT, modulate the resulting time-do-main signal with both the complex conjugate of the original phase code applied to the sub-channel and the phase code that was applied to extract another sub-channel, and then convert the modulated signals back to the frequency domain by an FFT. As a next step, the processor 200 can, for each sub-channel, subtract the estimated residue from each of the corresponding suppressed sub-channels to produce residueremoved signals. As a next step, the procedure can alternatively be repeated one or more times after subtraction of the estimated residues.

Additional details for performing REST are provided in Applicant's commonly assigned U.S. Pat. No. 9,952,319, titled "Residue Cancellation for Automated Vehicle MIMO RADAR," issued Apr. 24, 2018, which is incorporated herein by reference in its entirety.

Performing the REST procedure increases the dynamic range of the radar system 100 in the Doppler domain. The REST procedure, however, is not always required or necessary. For example, if a dominant target is present, REST is required because the reflected signals from the dominant target can bury a smaller target in its own residue. As such, REST is required to remove the residue to process the received signals and identify received signals reflected from any potential smaller target in the sensing environment. When a dominant target is not present in the sensing environment, however, noise in the received signal 108 will dominate more than the residue and REST processing will not help as much as when a dominant target is present.

For these reasons, the processor 200 determines whether to perform REST by analyzing a predetermined REST criteria using REST determination code and criteria 212. For example, for each receive bin, the processor 200 determines a total amplitude of the bin to make a preliminary determination of whether a dominant target is present. The total amplitude is then compared with a noise estimate from a previous signal receive frame. If the ratio of the total amplitude in the current bin to the noise estimate from the previous frame is greater than a predetermined ratio threshold, then a dominant target is determined to be present in the sensing environment and the processor 200 proceeds with performing REST for the current received signal bin. If the ratio is less than the predetermined ratio threshold, then the amplitude is close to the noise, which is an indication that a dominant target is not present in the environment. In this case, the processor 200 determines that REST processing is not needed for the current receive signal bin. The noise estimate from the previous frame is used as the noise estimate is not determined until later in the process after the Doppler FFT processing, described below. As such, the processor 200 uses the most recent noise estimate from the previous frame to determine the ratio amplitude to noise for purposes of evaluating the REST criteria and determining whether REST processing should be performed.

After determining whether REST processing is to be performed, the processor 200 then selects a window function to use for performing Doppler FFT using the window selection code 214 stored in memory 202. A window function is, for example, a mathematical function that is zero-valued outside of a chosen interval. The window function can, for example, be symmetrical, approaching a maximum around a middle of the interval and then taper away from the middle. When the window function is applied to another waveform or data-sequence, the resulting product becomes zero-valued outside of the interval and the non-zeroed remainder is the portion of the waveform or data-sequence that overlaps with the window function, thereby creating a view of the waveform or data-sequence through the window function, i.e., the portion of the waveform or data-sequence that overlaps with the window function.

As discussed above, a Chebyshev window function can be used for Doppler FFT processing and provides a relatively high dynamic range and a relatively low and uniform SLL for the Doppler FFT, as compared with other window functions. A Chebyshev window function, for example, minimizes a Chebyshev norm (also referred to as a uniform norm, supremum norm, or infinity norm) of the side-lobes of the function for a given main lobe width. Use of the Chebyshev window function can result, however, in a SNR loss. For example, a Chebyshev window function with a 40 dB SLL can have a 1.07 dB SNR or processing loss, as compared with a rectangular window. When a dominant target is present, the increased SNR loss is not a concern as the dominant target can still be detected even with the increased SNR loss. As such, the higher dynamic range of the Chebyshev window function can be used for increased dynamic range to potentially reveal a smaller target.

The residue level, however, can be significantly higher than the sidelobe level of the Chebyshev window employed. For example, for double-dwell radar implementations using 512 chirps per frame, the average BPM residue level is about 28 dB lower from the peak, with a maximum of 20 dB. For single dwell radar implementations using 256 chirps per frame, the average BPM residue is 26 dB lower from the peak, with a maximum of 16 dB. When a dominant target is present and REST is performed, the residue is subtracted and the SLL of the Doppler FFT using the Chebyshev window can be taken advantage of. However, when REST is not performed, the 26 dB/28 dB residue levels remain, and the lower Chebyshev SLL would not beneficially impact the processing of the Doppler FFT.

As such, the systems and methods of the present disclosure beneficially utilize and select a different window function for use in Doppler FFT processing for bins when REST processing is not performed. For example, the systems and methods of the present disclosure can select and utilize a window function having a higher associated SNR. For further example, for bins when REST is not performed a Taylor window function having a higher SNR, i.e., lower SNR loss, as compared with the Chebyshev window function, can be used in the Doppler FFT processing. Use of the Taylor window function can increase the probability of detection of smaller targets at longer ranges when REST processing is not performed. In this way, the systems and methods of the present disclosure can select and utilize a window function having a higher dynamic range with greater SNR loss, i.e., a higher SNR degradation, such as a Chebyshev window function, when a dominant target is present and REST processing is performed. Additionally, the systems and methods of the present disclosure can select and utilize a window function having a lower dynamic range with higher SNR, i.e., less SNR loss or less SNR degradation, such as a Taylor window function, when a dominant target is not present and REST processing is not performed. The Taylor window function is similar to the Chebyshev window function, except that the Taylor window function allows tradeoffs between the main lobe width and the sidelobe level, while the Chebyshev window has the narrowest possible main lobe for a specified sidelobe level. In this way, the Taylor window function provides an approximation that avoids discontinuities at the edges of the Chebyshev window due to an equiripple condition by allowing the equiripples to drop off at the edges.

Figure 3:
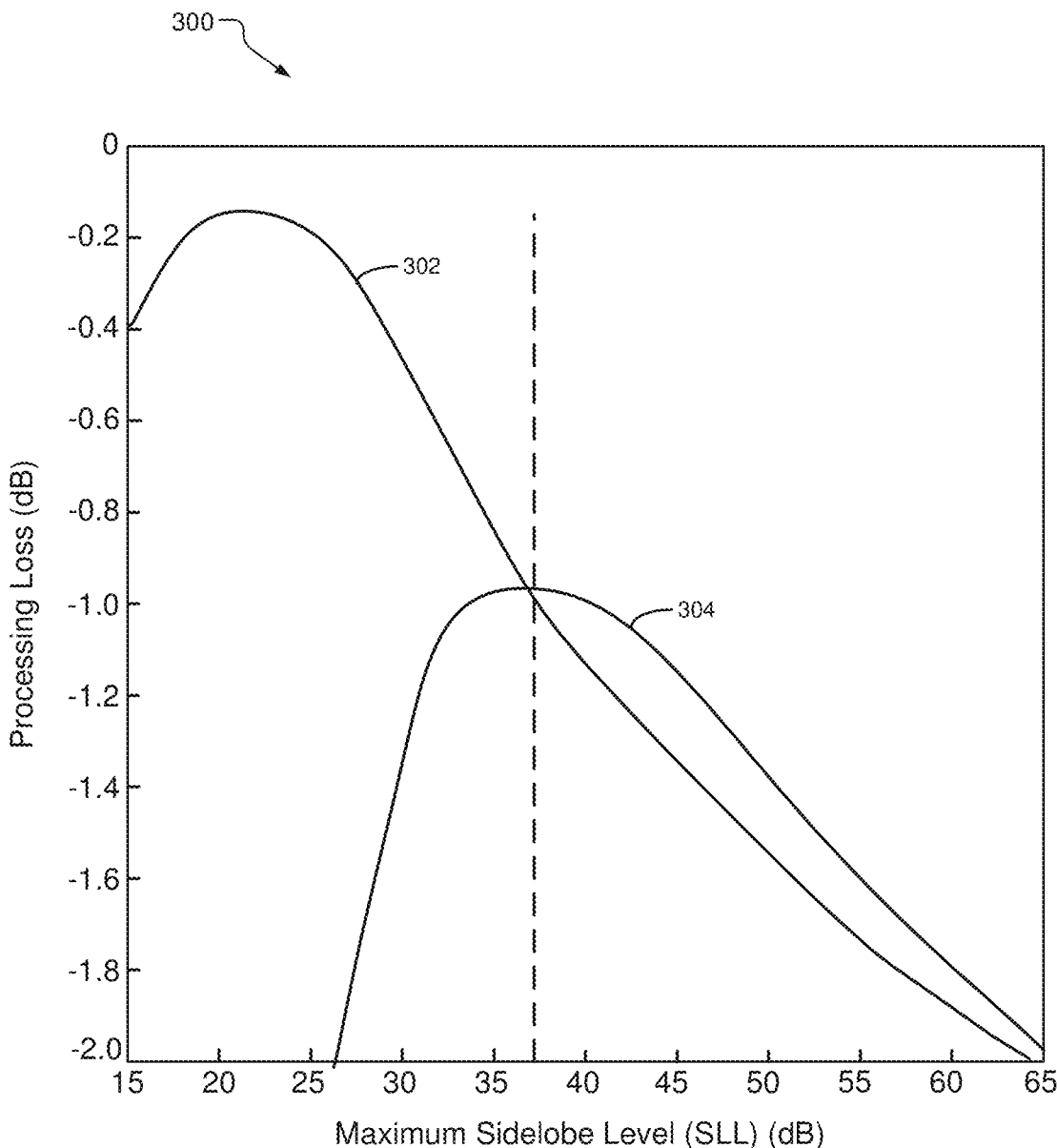
FIG. 3 is a graph illustrating maximum sidelobe level (SLL) and processing loss (dB) of different window functions.

With reference to FIG. 3, a graph 300 illustrates processing loss vs. SLL for Taylor and Chebyshev window functions. In the graph 300, processing loss (dB) is shown on the vertical axis and maximum SLL (dB) is shown on the horizontal axis. In graph 300, curve 302 represents Taylor window functions and curve 304 represents Chebyshev window functions. As shown, with a maximum SLL greater than 37 dB, the Chebyshev window functions have less processing loss and less resulting SNR loss than the Taylor window functions. As further shown, for a maximum SLL less than 37 dB, the Taylor window functions have less processing loss and less resulting SNR loss than the Chebyshev window functions.

In an example implementation of the systems and methods of the present disclosure, when a dominant target is present and REST is performed, the processor 200 can select and utilize a Chebyshev window function with a SLL of 40 dB and a processing/SNR loss of −1.07 dB. Further, when a dominant target is not present and REST is not performed, the processor 200 can select and utilize a Taylor window function. The Taylor window function can be selected having at least 3 dB lower than the maximum residue level of the BPM cross-code to avoid false detection. Further, Different Taylor window functions can be selected based on whether the radar system 100 is utilizing a single dwell waveform, i.e., 256 chirps per frame, or a double dwell waveform, i.e., 512 chirps per form. For example, with a single dwell implementation when a dominant target is not present and REST is not performed, the maximum residue level is about 16 dB. In this case, the processor 200 can select a Taylor window function with an SLL of 20 dB and a processing/SNR loss of approximately −0.16 dB. As compared with the Chebyshev window function having a processing/SNR loss of −1.07 dB, the selection of this Taylor window function improves the SNR and reduces SNR loss by about 0.91 dB. Similarly, with a double dwell implementation when a dominant target is not present and REST is not performed, the maximum residue level is about 20 dB. In this case, the processor 200 can select a Taylor window function with an SLL of 25 dB and a processing/SNR loss of approximately −0.34 dB. As compared with the Chebyshev window function having a processing/SNR loss of −1.07 dB, the selection of this Taylor window function improves the SNR and reduces the SNR loss by about 0.73 dB.

With reference again to FIGS. 1 and 2, once the processor 200 selects the window function for use with the current receive bin signals 108, the processor 200 performs Doppler FFT on the received signals 108 using the Doppler FFT code 216 stored in memory 202 and using the selected window function. After performing Doppler FFT on the received signals 108, and if the processor 200 previously determined that REST was required, the processor then performs REST using the REST code 218.

The processor 200 can then perform object detection and determine information about the object 106, such as the location, size, orientation, velocity and acceleration of the object 106, based on the processed signals using detection code 218 stored in memory 202.

In addition, the processor 200 can communicate the information about the object 106, such as the location, size, orientation, velocity and acceleration of the object 106, to other vehicle systems 220, such as autonomous driving systems and/or advanced driver assistance systems (ADAS), etc. The other vehicle systems can then utilize and process the information about the object 106 to appropriately control steering, braking, throttle, and/or other vehicle operations of the vehicle 102 based on the information about the object 106.

Figure 4:
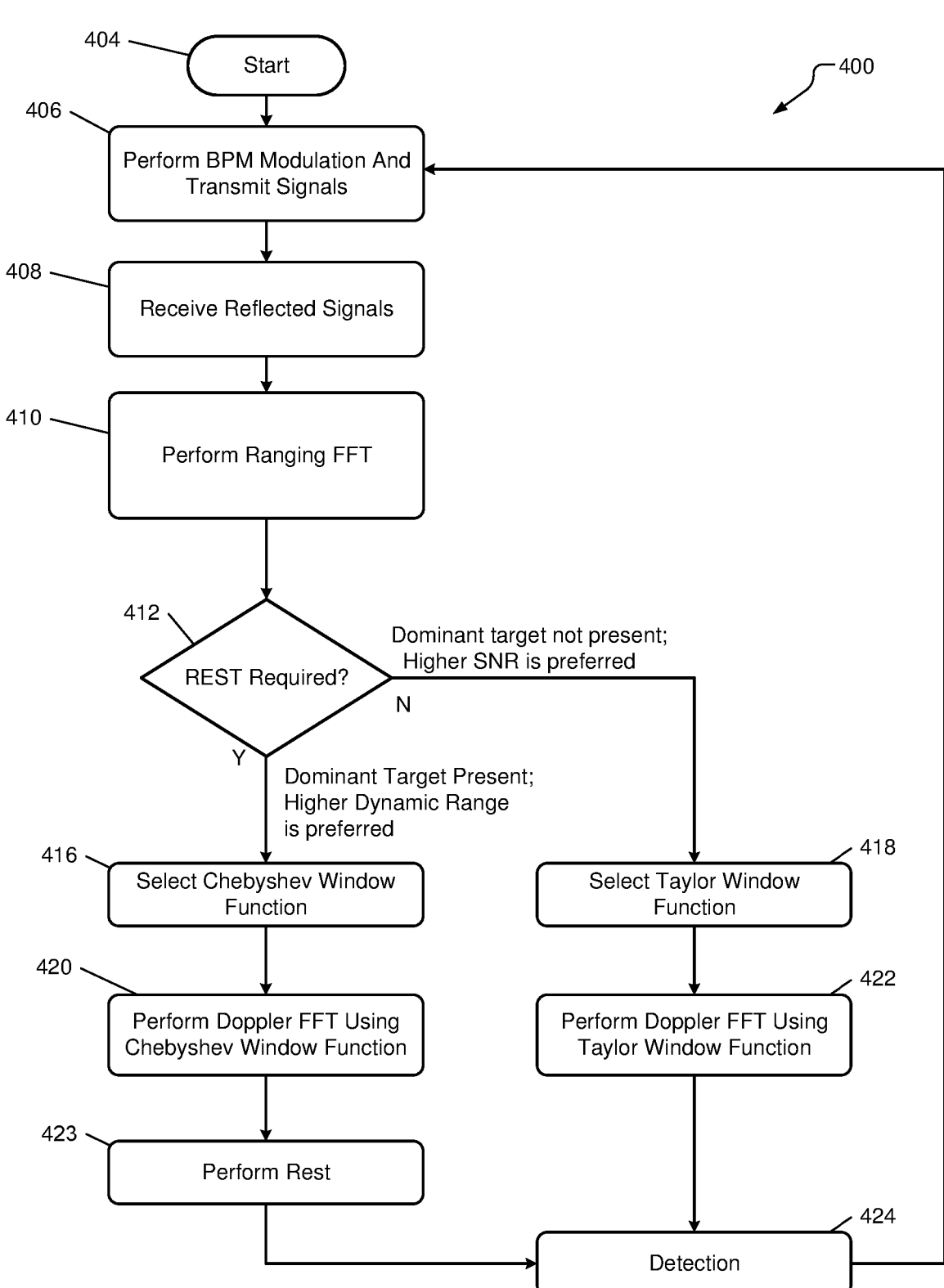
FIG. 4 is a flow chart of a method for selecting window functions in accordance with the present disclosure.

With reference to FIG. 4, a method 400 for selecting a window function and performing Doppler FFT using a selected window function, in accordance with the present disclosure, is shown. The method 400 can be performed by the processor 200 using code stored in memory 202 and starts at 404. At 406, the processor 200 performs BPM modulation on the transmit signals 104 transmitted by the different transmit channels. As described above, different BPM codes 208 are used for different transmit channels so that signals received by the receive channel can be differentiated and distinguished from each other. At 408, the processor 200 receives the reflected signals 108. At 410, the processor 200 performs ranging FFT on the received signals 108 using the range FFT code 210 stored in memory.

At 412, the processor 200 determines whether REST is required. For example, as discussed above, the processor 200 analyses a predetermined REST criteria to determine whether REST is required for a current receive signal bin using the REST determination and criteria code 212 stored in memory 202. For example, the processor 200 determines whether a dominant target is present based on a total amplitude of the current bin and a noise estimate from a previous frame. If the ratio of the total amplitude in the current bin to the noise estimate from the previous frame is greater than a predetermined ratio threshold, the processor 200 determines that a dominant target is present in the environment and that REST processing should be performed. If the ratio is less than the predetermined ratio threshold, then the amplitude is close to the noise, which is an indication that a dominant target is not present in the environment. In this case, the processor 200 determines that REST processing is not needed for the current receive signal bin.

When the processor 200 determines that REST is required at 412, a dominant target has been determined to be present and a higher dynamic range is preferred. In this case the processor 200 proceeds to 416 and selects the Chebyshev Window function for use in the Doppler FFT processing of the received signal bin.

When the processor 200 determines that REST processing is not required at 412, a dominant target has not been determined to be present and a higher SNR is preferred. In this case, the processor 200 proceeds to 418 to select the Taylor window function for use in Doppler FFT processing of the received signal bin.

After selecting the appropriate window function at 416 or 418, the processor 200 then proceeds to 420 or 422 and performs Doppler FFT processing using the selected window function. In particular, at 420 when REST is required, the processor 200 performs Doppler FFT using the Chebyshev window function. In particular, at 422 when REST is not required, the processor 200 performs Doppler FFT using the Taylor window function. Different sets of window coefficients 215 can be stored in memory 202 corresponding to the applicable window functions, e.g., the Chebyshev and Taylor window functions. At 420 and 422, the processor 200 loads the appropriate set of window coefficients 215 for the selected window function by retrieving and loading the appropriate set of window coefficients 215 from memory 202. The processor 200 then performs the Doppler FFT processing on the receive signal bin using the appropriate window coefficient corresponding to the selected window function using the Doppler FFT code 216 stored in memory 202.

At 423, having determined that REST is required at 412, and after preforming Doppler FFT using the Chebyshev window function, the processor 200 then performs REST processing on the current received signal bin using the REST code 218 stored in memory.

After performing REST at 423, and after performing Doppler FFT using the Taylor window function without performing REST at 422, the processor 200 then proceeds to object detect at 424 based on the processed receive signals using the detection code 219 stored in memory 202. For example, the processor 200 can perform object detection and determine information about the object 106, such as the location, size, orientation, velocity and acceleration of the object 106, based on the processed signals. For example, the processor 200 can perform object detection using detection code 218 stored in memory 202.

The processor then loops back to 406 and proceeds with another iteration of transmitting, receiving, and processing signals.

In this way, the present disclosure provides systems and methods for adaptive Doppler window function selection and receive signal processing based on characteristics of the sensing environment.

The foregoing description of the embodiments has been provided for purposes of illustration and description and is not intended to be exhaustive or to limit the disclosure. Individual elements or features of a particular embodiment are generally not limited to that particular embodiment, but, where applicable, are interchangeable and can be used in another embodiment, even if not specifically shown or described. The various embodiments may also be varied in many ways. Such variations are not to be regarded as a departure from the disclosure, and all such modifications are intended to be included within the scope of the disclosure. Although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Example embodiments are provided so that this disclosure will be thorough and will fully convey the scope to those who are skilled in the art. Specific details are set forth, including examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference and not to indicate a fixed order.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard (including Core Specification versions 3.0, 4.0, 4.1, 4.2, 5.0, and 5.1 from the Bluetooth SIG) from the Bluetooth Special Interest Group (SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media.

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP

13

(PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A radar system comprising a processor and memory configured to:
  transmit radar signals using a plurality of transmit channels by performing binary phase modulation (BPM) using different BPM codes for each of the plurality of transmit channels;
  receive radar signals reflected from at least one object with a receive channel;
  determine whether a dominant target is present in a sensing environment of the radar system based on the received radar signals by determining a total amplitude of received signals in a current receive bin and a noise estimate from a previous frame, and determining that the dominant target is present in response to a ratio of the total amplitude to the noise estimate being greater than a predetermined ratio threshold;
  select one of a first window function and a second window function based on whether the dominant target is present in the sensing environment;
  perform a Doppler fast Fourier transform (FFT) procedure with the selected window function from the first and second window functions, the first and second window functions having different signal-to-noise ratio (SNR) degradations when used in performing the Doppler FFT procedure; and
  determine information about the at least one object based on performing the Doppler FFT procedure, the information including at least one of a location, a size, an orientation, a velocity, and an acceleration of the at least one object.

2. The radar system of claim 1, wherein the SNR degradation of the first window function is less than the SNR degradation of the second window function.

3. The radar system of claim 2, wherein:
  the first window function is selected by the processor for performing the Doppler FFT in response to determining that the dominant target is not present in the sensing environment of the radar system; and
  the second window function is selected by the processor for performing the Doppler FFT in response to determining that the dominant target is present in the sensing environment of the radar system.

4. The radar system of claim 1, wherein the processor and memory are further configured to perform a residue estimation and subtraction technique (REST) to remove residue resulting from performing BPM using different BPM codes for each of the plurality of transmit channels in response to determining that the dominant target is present in the sensing environment of the radar system.

5. The radar system of claim 1, wherein the radar system is located in a vehicle and the information about the at least one object is communicated to a vehicle system that controls at least one of a steering system, a braking system, and a throttle system of the vehicle based on the information about the at least one object.

6. The radar system of claim 5, wherein the vehicle system includes at least one of an autonomous driving system and a driver assistance system.

14

7. A method comprising:
  transmitting, with a radar system having a processor and memory, radar signals using a plurality of transmit channels by performing binary phase modulation (BPM) using different BPM codes for each of the plurality of transmit channels;
  receiving, with the radar system, radar signals reflected from at least one object with a receive channel;
  determining, with the radar system, whether a dominant target is present in a sensing environment of the radar system based on the received radar signals by determining, with the radar system, a total amplitude of received signals in a current receive bin and a noise estimate from a previous frame, and determining, with the radar system, that the dominant target is present in response to a ratio of the total amplitude to the noise estimate being greater than a predetermined ratio threshold;
  selecting, with the radar system, one of a first window function and a second window function based on whether the dominant target is present in the sensing environment, the first and second window functions having different signal-to-noise ratio (SNR) degradations;
  performing, with the radar system, a Doppler fast Fourier transform (FFT) procedure with the selected window function from the first and second window functions; and
  determining, with the radar system, information about the at least one object based on performing the Doppler FFT procedure, the information including at least one of a location, a size, an orientation, a velocity, and an acceleration of the at least one object.

8. The method of claim 7, wherein the SNR degradation of the first window function is less than the SNR degradation of the second window function.

9. The method of claim 8, wherein:
  the first window function is selected for performing the Doppler FFT in response to determining that the dominant target is not present in the sensing environment of the radar system; and
  the second window function is selected for performing the Doppler FFT in response to determining that the dominant target is present in the sensing environment of the radar system.

10. The method of claim 7, further comprising:
  performing, with the radar system, a residue estimation and subtraction technique (REST) to remove residue resulting from performing BPM using different BPM codes for each of the plurality of transmit channels in response to determining that the dominant target is present in the sensing environment of the radar system.

11. The method of claim 7, wherein the radar system is located in a vehicle, the method further comprising communicating the information about the at least one object to a vehicle system that controls at least one of a steering system, a braking system, and a throttle system of the vehicle based on the information about the at least one object.

12. The method of claim 11, wherein the vehicle system includes at least one of an autonomous driving system and a driver assistance system.

* * * * *